US011686348B2

United States Patent
Baracca et al.

(10) Patent No.: US 11,686,348 B2
(45) Date of Patent: Jun. 27, 2023

(54) BEARING UNIT MADE OF LOW CARBON STEEL

(71) Applicant: AKTIEBOLAGET SKF, Gothenburg (SE)

(72) Inventors: Fausto Baracca, Massa (IT); Ettore Bertelloni, Massa (IT); Fabio Cavacece, Rome (IT)

(73) Assignee: Aktiebolaget SKF (SE)

( * ) Notice: Subject to any disclaimer, the term of this patent is extended or adjusted under 35 U.S.C. 154(b) by 0 days.

(21) Appl. No.: 17/516,842

(22) Filed: Nov. 2, 2021

(65) Prior Publication Data

US 2022/0145935 A1 May 12, 2022

(30) Foreign Application Priority Data

Nov. 9, 2020 (IT) .................. 102020000026608

(51) Int. Cl.
*F16C 19/06* (2006.01)
*F16C 33/62* (2006.01)
(Continued)

(52) U.S. Cl.
CPC .............. *F16C 33/62* (2013.01); *F16C 33/58* (2013.01); *F16C 33/64* (2013.01); *F16C 19/06* (2013.01);
(Continued)

(58) Field of Classification Search
CPC ...... F16C 19/06; F16C 23/084; F16C 33/585; F16C 33/62; F16C 33/64; F16C 33/7853;
(Continued)

(56) References Cited

U.S. PATENT DOCUMENTS 3,791,706 A * 2/1974 Dobson ................. F16C 19/166
74/431
2005/0013722 A1* 1/2005 Usami ................... C22C 38/004
420/93
(Continued)

FOREIGN PATENT DOCUMENTS

CN 101876100 A * 11/2010 ............. D01G 19/18
DE 102008029018 A1 * 12/2009 ........... B60G 15/068
(Continued)

OTHER PUBLICATIONS

C45 steel_https://www.round-bars.com/products/c45-steel/.*
(Continued)

*Primary Examiner* — Phillip A Johnson
(74) *Attorney, Agent, or Firm* — Reed Smith LLP

(57) ABSTRACT

A bearing unit having a stationary radially outer ring provided with a raceway, a radially inner ring rotatable about a central rotation axis (X) of the bearing unit and provided with a raceway, a row of rolling elements interposed between the radially outer ring and the radially inner ring, at least one sealing device mounted by means of interference on the radially outer ring and in sliding contact with the radially inner ring, wherein both the radially outer ring and the radially inner ring are made of low carbon steel with a minimum percentage by weight of carbon equal to 0.42%, and a central portion of the radially outer ring situated along the raceway and a central portion of the radially inner ring situated along the raceway are heat treated by means of induction hardening.

17 Claims, 1 Drawing Sheet

(51) Int. Cl.
*F16C 33/64* (2006.01)
*F16C 33/58* (2006.01)

(52) U.S. Cl.
CPC ...... *F16C 2204/62* (2013.01); *F16C 2204/64* (2013.01); *F16C 2223/18* (2013.01)

(58) Field of Classification Search
CPC .............. F16C 33/7856; F16C 33/7876; F16C 2204/62; F16C 2223/18
See application file for complete search history.

(56) References Cited

U.S. PATENT DOCUMENTS

| | | | |
|---|---|---|---|
| 2009/0052823 A1* | 2/2009 | Komori | F16C 19/497 384/454 |
| 2012/0134616 A1* | 5/2012 | Liang | F16C 19/163 148/567 |
| 2015/0330449 A1* | 11/2015 | Ribault | F16C 33/64 219/121.64 |
| 2020/0040944 A1* | 2/2020 | Sticht | F16C 33/586 |
| 2020/0166080 A1* | 5/2020 | Gegner | C22C 38/42 |

FOREIGN PATENT DOCUMENTS

| | | | |
|---|---|---|---|
| DE | 102011077021 A1 * | 12/2012 | C23C 18/1216 |
| EP | 1541377 | 6/2005 | |
| EP | 2572901 | 3/2013 | |
| EP | 3205513 | 8/2017 | |
| JP | 2001208083 | 8/2001 | |
| JP | 2005282691 A * | 10/2005 | |
| JP | 2008057599 | 3/2008 | |
| JP | 2009255644 | 11/2009 | |
| JP | 2011143733 | 7/2011 | |
| JP | 2013164160 A * | 8/2013 | |
| JP | 2829755 | 1/2015 | |
| WO | 2014054719 | 4/2014 | |

OTHER PUBLICATIONS

C48 steel_https://www.alokindia.com/wp-content/uploads/2017/12/C48.pdf.*
Low Carbon Steel—an overview_ScienceDirect_Topics_https://www.sciencedirect.com/topics/materials-science/low-carbon-steel.*
What are Properties of Low-carbon Steel—Definition_Material Properties_https://material-properties.org/what-are-properties-of-low-carbon-steel-definition/.*
JP20130164160_description.*
Search Report for corresponding Italian Application No. 202000026608 dated Jul. 23, 2021.

* cited by examiner

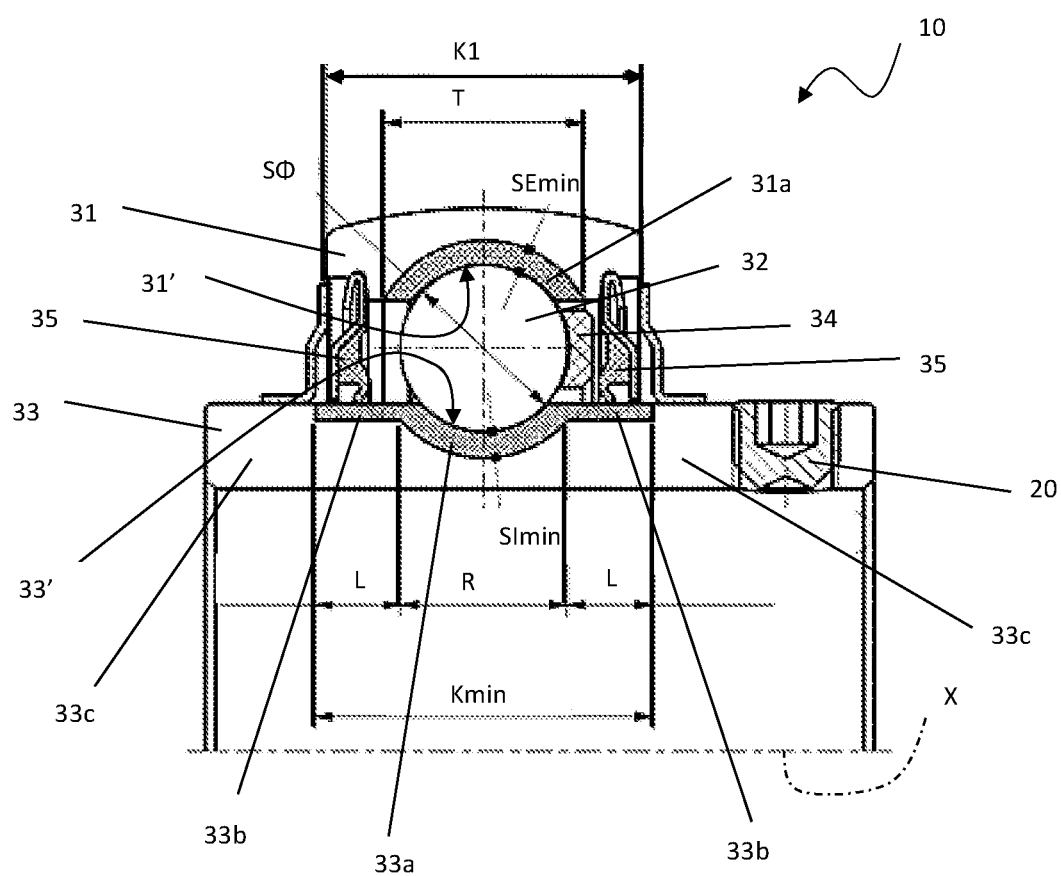

BEARING UNIT MADE OF LOW CARBON STEEL

CROSS-REFERENCE RELATED APPLICATION

This application is based on and claims priority to Italian Patent Application No. 102020000026608 filed on Nov. 9, 2020, under 35 U.S.C. § 119, the disclosure of which is incorporated by reference herein.

TECHNICAL FIELD

This disclosure relate to bearing units made of low carbon steel locally hardened by means of induction hardening. Such bearing units are suitable for application in, for example, the manufacturing industry and the agricultural industry because they are simple and inexpensive to produce.

BACKGROUND

Bearing units provided with rolling elements and systems for fastening the said units on a rotating shaft are known.

BRIEF DESCRIPTION OF THE DRAWINGS

Example embodiments in accordance with this disclosure will now be described with reference to the attached FIGURES.

FIG. 1 shows a cross-sectional view of a bearing unit made of low carbon steel, which may be combined with an induction-hardening treatment, in accordance with this disclosure.

DETAILED DESCRIPTION

In particular, bearing units described in accordance with this disclosure are provided with a radially inner ring and a radially outer ring, which are both made of low carbon steel. A specific induction-hardening heat treatment is combined with both of the rings of these bearing units.

Bearing units are used to allow the relative movement of a component or group with respect to another component or group. Bearing units generally have a radially inner ring, which is fixed to a first component, for example a rotating shaft, and a radially outer ring, which is fixed to a second component, for example a stationary housing. In some embodiments, as in the examples mentioned above, the radially inner ring is rotatable, while the radially outer ring is stationary. In other embodiments, the radially outer ring is rotatable and the radially inner ring is stationary. The rotation of one ring with respect to the other ring is allowed by a plurality of rolling elements positioned between a cylindrical surface of the radially inner ring and a cylindrical surface of a radially outer ring. Such cylindrical surfaces are normally called raceways. Rolling elements may be balls, cylindrical or tapered rollers, needle rollers, or similar rolling elements.

In various embodiments, bearing units are provided with fastening elements, typically screws, for fixing the radially inner ring to a rotating shaft.

Usually material used for bearing units is a steel with a high carbon content, for example 100Cr6 steel. Using this material, combined with a full hardening heat treatment, it is possible to obtain hardness levels (typically 58 to 62 HRC) for operation of a bearing unit. In particular, high hardness may be required for the raceways, which may withstand the loads transmitted by the rolling elements. In fact, the Hertzian contact between the rings of the bearing unit and the rolling elements (balls, rollers, etc.) requires surfaces which are sufficiently hardened so they do not create deformations and consequent vibrations and noise. The use of high-quality material, such as 100Cr6 steel, and the subsequent full hardening heat treatment, result in relatively high costs of production of a bearing unit.

Accordingly, there exists a need to define a bearing unit made of a different material which is reliable mechanically, ensuring the required performance features of the bearing unit does not cause excessive noise and/or vibrations, and that is sustainable from a cost point of view.

With reference now to FIG. 1, below exemplary embodiments of a bearing unit in accordance with this disclosure are described purely by way of example.

A bearing unit 10, which is particularly suitable for applications in the agricultural sector and/or in the manufacturing industry—for example textile, mining, automobile and food industry—may be arranged, for example, between a rotating shaft and a housing element. In various embodiments, a bearing unit 10 may include a stationary radially outer ring 31, a radially inner ring 33 that is rotatable about a central rotation axis X of the bearing unit 10, and at least one row of rolling elements 32 interposed between the radially outer ring 31 and the radially inner ring 33. By way of a non-limiting example, rolling elements 33 may be balls. A bearing unit, e.g., 10, may also include a cage 34 for containing the rolling elements 32 so as to keep the rolling elements 32 in a row, and a fastening element 20, for example a screw, for fastening the radially inner ring 33 to a rotating shaft.

In the whole of the present disclosure and in the claims, the terms and the expressions indicating positions and orientations such as "radial" and "axial" are understood as being in relation to the central rotation axis X of the bearing unit 10.

A radially outer ring 31 is provided with a radially outer raceway 31', while a radially inner ring 33 is provided with a radially inner raceway 33', each for allowing rolling of a row of rolling elements 32 interposed between the radially outer ring 31 and the radially inner ring 33. For the sake of simplicity, the term "ball" may be used by way of example in the present disclosure and in the attached drawings instead of the more generic term "rolling element" (and likewise the same reference numbers will be used). Some examples of embodiments and the associated drawings may envisage the use of rolling elements other than balls (for example, rollers) without thereby departing from the scope of this disclosure.

Bearing unit 10 is also provided with sealing devices 35 for sealing off the bearing unit from an external environment. Sealing devices, e.g., 35, may be mounted by means of interference onto a radially outer ring 31 and make sliding contact, by means of one or more elastomer lips, with a radially inner ring 33.

In various embodiments, both a radially outer ring 31 and a radially inner ring 33 are made of a low carbon steel. The minimum percentage of carbon required is equal to 0.42% in either a radially outer ring 31 of a radially inner ring 33. By way of example, in accordance with this disclosure, materials suitable for the purpose may be, e.g., C45 steel which has a percentage of carbon within the range 0.42%-0.45% or C48 steel which has a percentage of carbon within the range 0.45%-0.52%.

In order to obtain a desirable hardness for operation of bearing units in accordance with this disclosure, an induction-hardening heat treatment is applied along the raceways, e.g., 31' and 33'. In this way a desirable hardness is obtained specifically in zones where a minimum hardness is desirable for correct operation of a bearing unit in accordance with this disclosure. In particular, a hardness of the raceways and in a portion of an inner ring or an outer ring underlying a raceways may be between 55 HRC and 62 HRC. In certain specific embodiments, a hardness of the raceways and in the portion of an inner ring or an outer ring underlying a raceways is between 55 HRC and 62 HRC.

In order to ensure the hardness in the raceways 31' and 33' of the radially outer ring 31 and radially inner ring 33, respectively, the induction-hardening heat treatment is performed by specifying geometric parameters and the hardness in different zones of the radially inner ring 33.

In exemplary embodiments in accordance with this disclosure, a central portion 31a of the radially outer ring 31 situated along the raceway 31' and having an axial length T subjected to induction-hardening heat treatment must ensure a hardness of between 55 HRC and 62 HRC over a depth SEmin of between 10% and 20% of a diameter SΦ of the rolling elements 32.

Similarly, in exemplary embodiments, a central portion 33a of the radially inner ring 33 situated along the raceway 33' and having an axial length R subjected to induction-hardening heat treatment must ensure a hardness of between 55 HRC and 62 HRC over a depth SImin of between 10% and 20% of the diameter 51 of the rolling elements 32.

In particular embodiments, the axial length T of the central portion 31a of the radially outer ring 31 and the axial length R of the central portion 33a of the radially inner ring 33 are equal.

In various embodiments, as regards the radially inner ring 33, it is possible to identify second portions 33b, which are more peripheral than and situated on opposite sides of the central portion 33a. Second portions 33b are situated opposite the sealing devices 35 and may have a high hardness (also between 55 HRC and 62 HRC) in order to avoid the wear caused by the sliding contact of lips of sealing devices 35. A depth of second portions 33b, where such hardness values may be guaranteed, is equal to at least 0.1 mm. An axial length L of second portions 33b may be equal to $$L=(Kmin-R)/2 \text{ with } Kmin=K1+1 \text{ mm}$$

where Kmin is an overall axial length of the central portion 33a and the second portions 33b of the radially inner ring 33, and K1 is an axial length of the radially outer ring 31.

Finally, still with reference to the radially inner ring 33, third portions or end portions 33c may be defined, which are more peripheral than and situated on opposite sides of second portions 33b. A hardness of between 50 HRC and 62 HRC may be ensured in third portions 33c, on a radially outer surface of the radially inner ring 33.

Below is a table showing desirable hardness values expressed in HRC for the different portions identified above.

TABLE 1

| Portion | Hardness (HRC) | |
|---|---|---|
| | Min | Max |
| 31a | 55 | 62 |
| 33a, 33b | 55 | 62 |
| 33c (on the surface) | 50 | 62 |

An advantage of the solution described, for the same performance features, is the reduction of the cost of the steel compared to that of the known steels (for example 100Cr6 steel). Moreover, it is possible to achieve savings in the production costs and the costs relating to the induction-hardening heat treatment by limiting the regions subjected to hardening. Consistent with at least one embodiment in accordance with this disclosure, the surface area undergoing hardening is limited to where the rolling elements are in contact with the rings of the bearing unit (i.e. the raceways and, if necessary, the zones in sliding contact with the sealing devices). Consequently, the cost of the entire bearing unit is reduced with regard to both the aforementioned aspects.

In at least one embodiment in accordance with this disclosure, a bearing unit made of a novel material with a low carbon content, for example a C45 or C48 steel, may be applied to the radially outer ring and to the radially inner ring. The novel material may have a percentage carbon content of not less than 0.42% and may be combined with an induction-hardening heat treatment carried out on the portions of the rings of the bearing unit situated along the raceways.

In another embodiment in accordance with this disclosure, the induction-hardening heat treatment may ensure a high hardness for a predetermined depth both of the radially inner ring and of the radially outer ring, starting from the surface of the corresponding raceways.

Advantageously, the induction-hardening treatment may be extended to the portions of the radially inner ring which are subjected to sliding contact by corresponding sealing devices.

In addition to the embodiments in accordance with this disclosure described above, it is to be understood that numerous further embodiments exist. It must also be understood that said embodiments are only examples and do not limit either the scope of the disclosure, its applications, nor its possible configurations. On the contrary, although the description provided enables the person skilled in the art to implement in at least one exemplary embodiments in accordance with this disclosure, it must be understood that numerous variations of the components described are feasible, without thereby departing from the scope of this disclosure, as defined in the accompanying claims, interpreted literally and/or in accordance with their legal equivalents.

The invention claimed is:

1. A bearing unit comprising:
   a radially outer ring comprising a radially outer raceway;
   a radially inner ring comprising a radially inner raceway;
   a row of rolling elements interposed between the radially outer ring and the radially inner ring;
   an outer induction hardened central portion defined within the radially outer raceway; and
   an inner induction hardened central portion defined within the radially inner raceway,
   wherein both the radially outer ring and the radially inner ring are made of a carbon steel with a minimum percentage by weight of carbon equal to 0.42%;
   wherein the outer induction hardened central portion comprises a hardness of between 55 HRC and 62 HRC over a depth SEmin of between 10% and 20% of a diameter (SΦ) of the rolling elements.

2. The bearing unit of claim 1, wherein the carbon steel is a C45 steel with a percentage by weight of carbon within the range 0.42%-0.45%.

3. The bearing unit of claim 1, wherein the carbon steel is a C48 steel with a percentage by weight of carbon within the range 0.45%-0.52%.

4. The bearing unit of claim 3, wherein the second central portion of the radially outer raceway has a hardness of between 55 HRC and 62 HRC over a depth SEmin of between 10% and 20% of the diameter SΦ of the rolling elements.

5. The bearing unit of claim 1, wherein the inner induction hardened central portion has a hardness of between 55 HRC and 62 HRC over a depth SImin of between 10% and 20% of the diameter (SΦ) of the rolling elements.

6. The bearing unit of claim 5, wherein an axial length (T) of the outer induction hardened central portion and an axial length (R) of the inner induction hardened central portion of the radially inner raceway are equal.

7. The bearing unit of claim 6, further comprising:
at least one sealing device mounted by means of interference on the radially outer ring and in sliding contact with the radially inner ring; and
a plurality of second portions of the radially inner ring, disposed on opposite axial sides about the inner induction hardened central portion of the radially inner raceway and radially opposite from the at least one sealing device,
wherein the plurality of second portions have a hardness of between 55 HRC and 62 HRC over a minimum depth of 0.1 mm.

8. The bearing unit of claim 1, further comprising:
at least one sealing device mounted by means of interference on the radially outer ring and in sliding contact with the radially inner ring; and
a plurality of second portions of the radially inner ring, disposed on opposite axial sides about the inner induction hardened central portion of the radially inner raceway and radially opposite from the at least one sealing device,
wherein the plurality of second portions have a hardness of between 55 HRC and 62 HRC over a minimum depth of 0.1 mm.

9. The bearing unit of claim 8, wherein an axial length (L) of the second portions is equal to $$L=(Kmin-R)/2$$

with $$Kmin=K1+1 \text{ mm}$$

wherein, Kmin is an overall axial length of the inner induction hardened central portion of the radially inner raceway and of the second portions of the radially inner ring, and wherein K1 is an axial length of the radially outer ring.

10. The bearing unit of claim 8, further comprising a plurality of third portions of the radially inner ring, disposed on opposite axial sides about the inner induction hardened central position of the radially inner raceway and axially outside of the plurality of second portions, wherein the plurality of third portions have a hardness of between 50 HRC and 62 HRC.

11. The bearing unit according to claim 8, wherein an axial length L of the second portions is equal to $$L=(Kmin-R)/2$$

with $$Kmin=K1+1 \text{ mm}$$

where Kmin is an overall axial length of the central portion of the radially inner raceway and of the second portions of the radially inner ring, and K1 is an axial length of the radially outer ring.

12. A bearing unit comprising:
a radially outer ring comprising a radially outer raceway and a central portion, the central portion situated along the radially outer raceway;
a radially inner ring comprising a radially inner raceway and a central portion, the central portion situated along the radially outer raceway;
a row of rolling elements interposed between the radially outer ring and the radially inner ring;
at least one sealing device mounted by means of interference on the radially outer ring and in sliding contact with the radially inner ring; and
a plurality of second portions of the radially inner ring disposed on opposite axial sides about the central portion of the radially inner raceway and radially opposite from the at least one sealing device,
wherein both the radially outer ring and the radially inner ring are made of a carbon steel having a minimum percentage by weight of carbon of 0.42%, and
wherein the central portion of the radially outer ring and the central portion of the radially inner ring are heat treated by means of induction hardening;
wherein the central portion of the radially inner ring comprises a hardness of between 55 HRC and 62 HRC over a depth SImin of between 10% and 20% of a diameter (SΦ) of the rolling elements.

13. The bearing unit of claim 12, wherein the carbon steel is a C45 steel with a percentage by weight of carbon within the range 0.42%-0.45%.

14. The bearing unit of claim 12, wherein the carbon steel is a C48 steel with a percentage by weight of carbon within the range 0.45%-0.52%.

15. A bearing unit comprising:
a radially outer ring comprising a radially outer raceway;
a radially inner ring comprising a radially inner raceway;
a row of rolling elements interposed between the radially outer ring and the radially inner ring;
at least one sealing device mounted by means of interference on the radially outer ring and in sliding contact with the radially inner ring;
an outer induction hardened central portion defined within the radially outer raceway;
an inner induction hardened central portion defined within the radially inner raceway;
a plurality of second portions of the radially inner ring disposed on opposite axial sides about the first inner induction hardened central portion of the radially inner raceway and radially opposite from the at least one sealing device; and
a plurality of third portions of the radially inner ring, disposed on opposite axial sides about the inner induction hardened central portion of the radially inner raceway, and axially outside of the plurality of second portions, wherein the plurality of third portions have a hardness of between 50 HRC and 62 HRC,
wherein both the radially outer ring and the radially inner ring are made of a carbon steel comprising a minimum percentage by weight of carbon of 0.42%,
wherein the plurality of second portions comprise a hardness of between 55 HRC and 62 HRC over a minimum depth of 0.1 mm,
wherein the outer induction hardened central portion of the radially outer ring and the inner induction hardened central portion of the radially inner ring have a hardness of between 55 HRC and 62 HRC over a depth of between 10% and 20% of a diameter SΦ of the rolling elements, and wherein an axial length L of the second portions is equal to $$L=(K\min-R)/2$$

with $$K\min=K1+1 \text{ mm}$$

where Kmin is an overall axial length of the first central portion of the radially inner ring and of the second portions of the radially inner ring, and K1 is an axial length of the radially outer ring.

16. The bearing unit of claim 15, wherein the carbon steel is a C45 steel with a percentage by weight of carbon within the range 0.42%-0.45%.

17. The bearing unit of claim 15, wherein the carbon steel is a C48 steel with a percentage by weight of carbon within the range 0.45%-0.52%.

* * * * *